INVENTOR
WALTER A. SHIELDS
BY
John A. Seifert
ATTORNEY

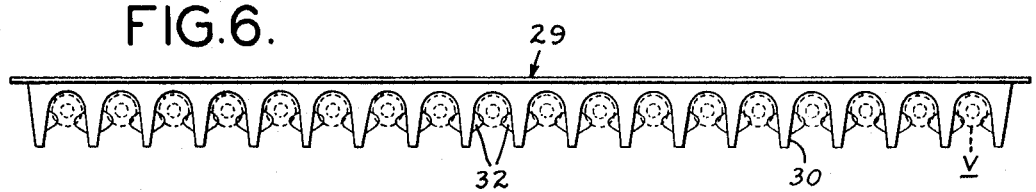
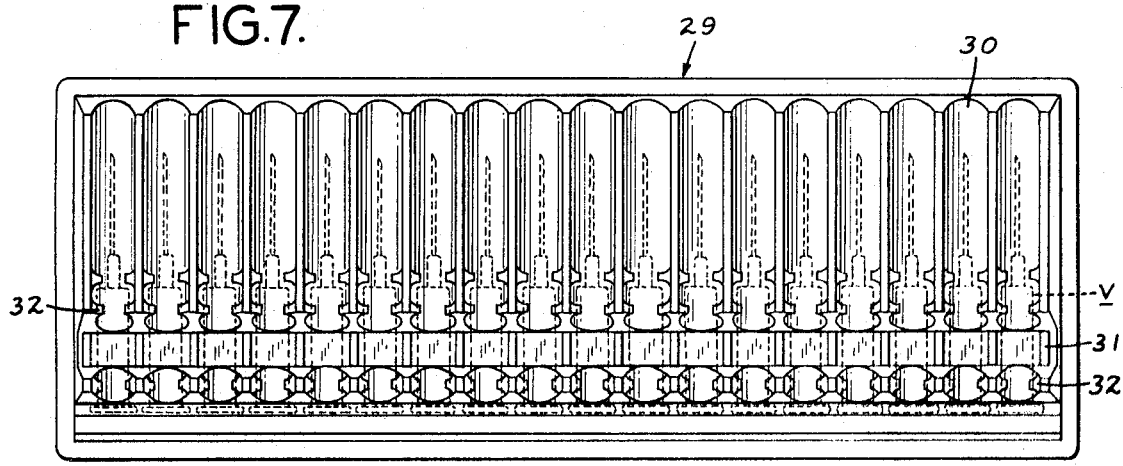
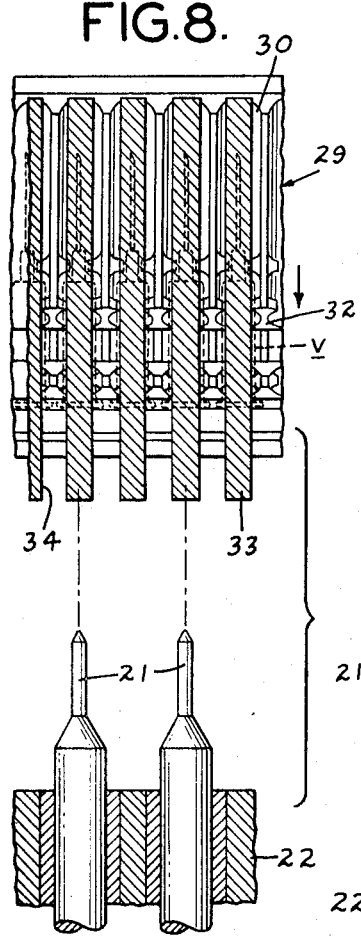
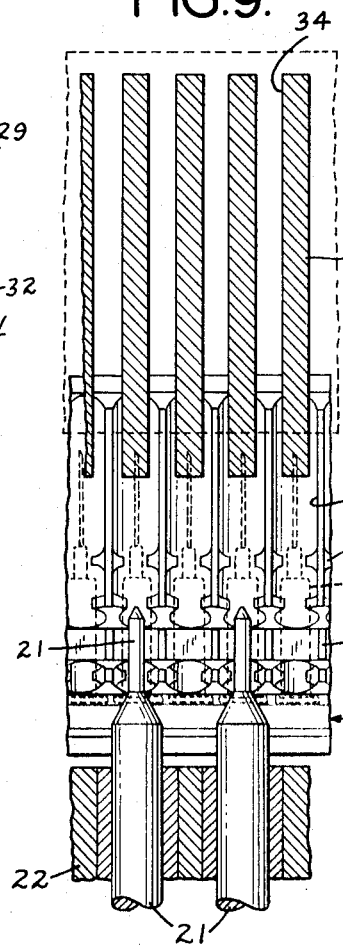
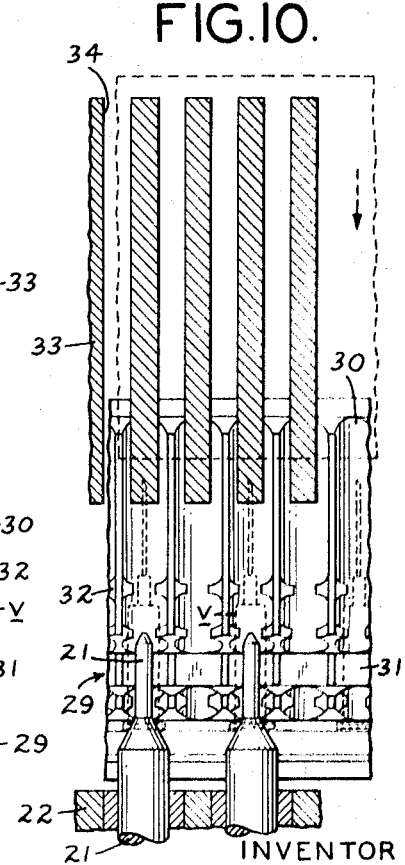

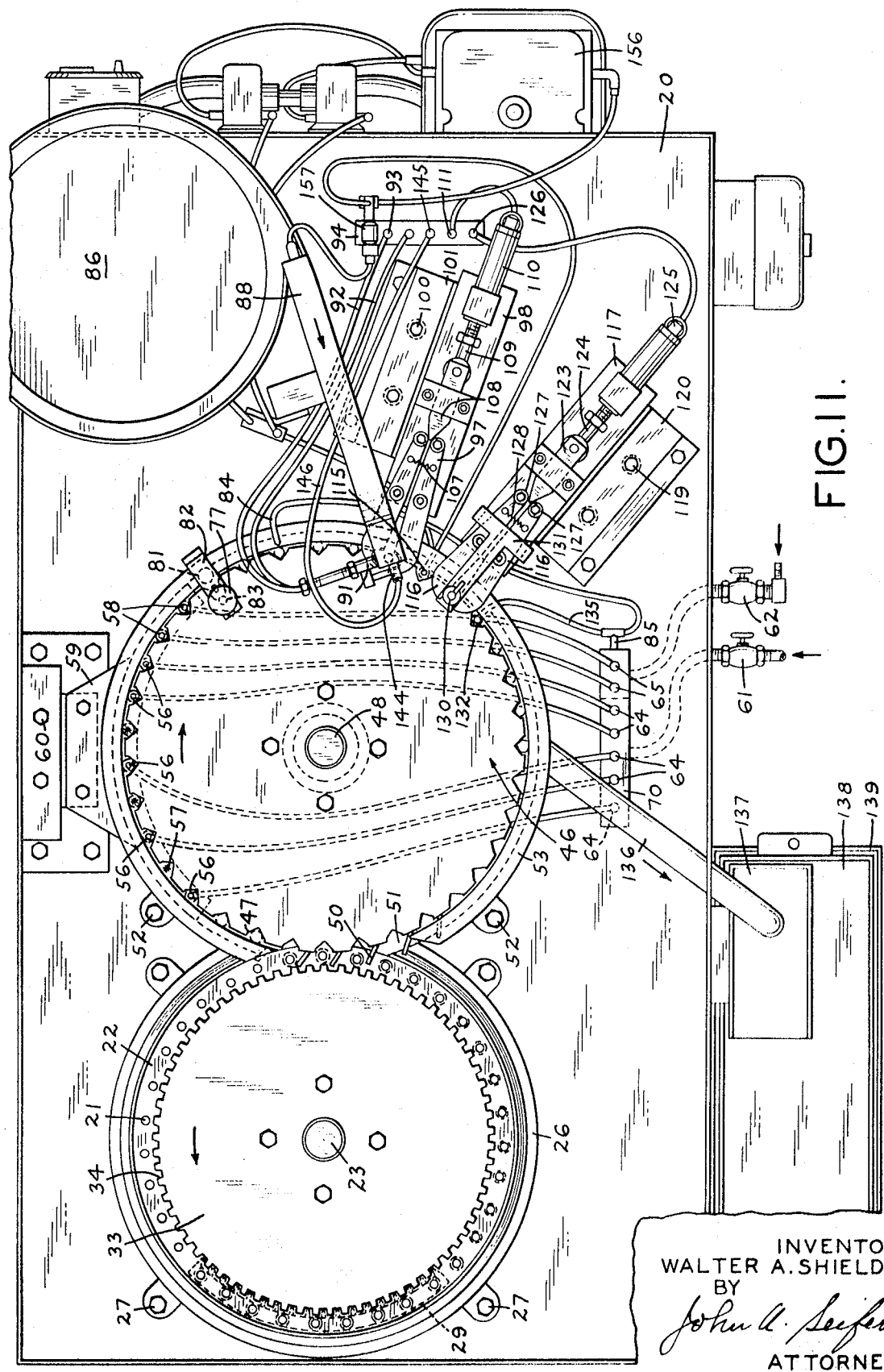

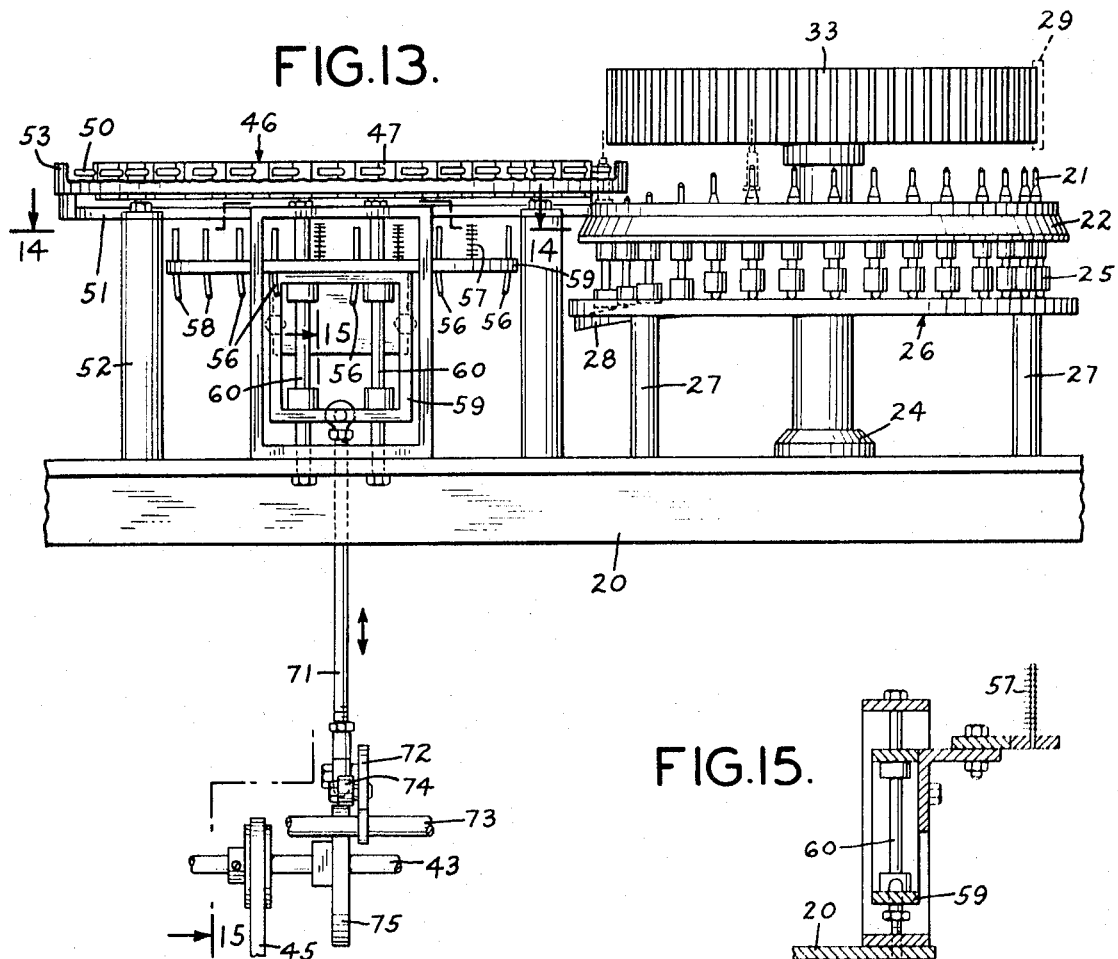
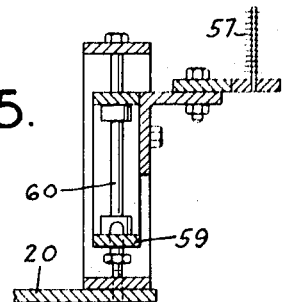
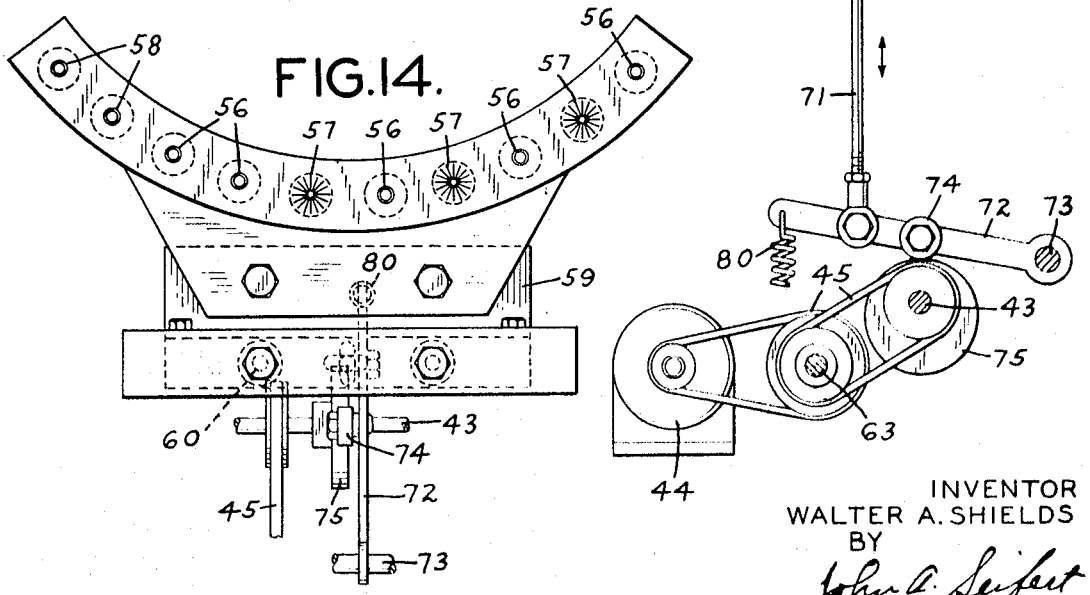

Nov. 30, 1971   W. A. SHIELDS   3,623,210
METHOD OF AND APPARATUS FOR APPLYING A SHEATH TO
A HYPODERMIC NEEDLE SECURED IN A VIAL
Filed July 10, 1969   10 Sheets-Sheet 9

INVENTOR
WALTER A. SHIELDS

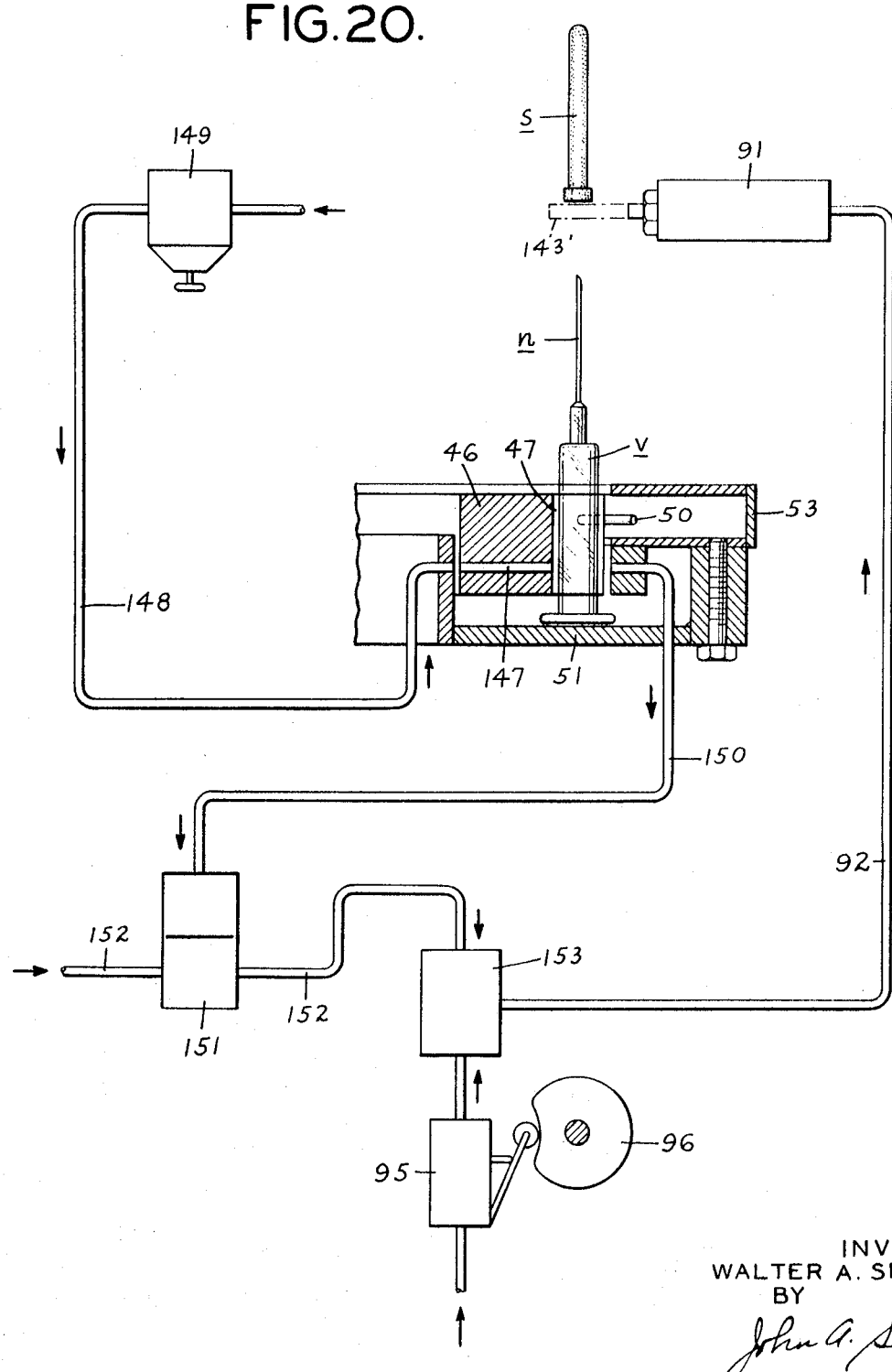

United States Patent Office 3,623,210
Patented Nov. 30, 1971

3,623,210
METHOD OF AND APPARATUS FOR APPLYING A SHEATH TO A HYPODERMIC NEEDLE SECURED IN A VIAL
Walter A. Shields, Jamaica, N.Y.
(38—09 24th St., Long Island City, N.Y. 11101)
Filed July 10, 1969, Ser. No. 840,668
Int. Cl. B23p 19/00
U.S. Cl. 29—429
20 Claims

ABSTRACT OF THE DISCLOSURE

The vials having hypodermic needles secured therein are intermittently presented to successive stations where the vials are internally cleaned, the junctures between the vials and the hypodermic needles are dried, the hypodermic needles are externally lubricated, the sheaths are engaged over the hypodermic needles, the interior of the vials are lubricated, the sheaths are fully engaged on the vials, and finally the interiors of the vials are dried.

---

The invention comprises spaced members reciprocally mounted on an intermittently rotated table and said members normally supported in position above said table to receive vials having hypodermic needles secured therein from a rack of flexible material and having recesses for holding said vials and said recesses in the rack being spaced from each other so that alternate vials are positioned on adjacent members of the table by manually moving said rack in a vertical downward direction. The table successively presents the vials to recesses in an intermittently rotated turret having a member adjacent each recess to remove successive vials from the table to successive recesses in the turret while the members on the table have been permitted to drop by gravity from their supporting position. The turret successively presents the vials and the hypodermic needles to a plurality of devices reciprocated into and out of the open ends of the vials to clean the interiors of the vials, to an air nozzle applying a jet of air to the junctures between the vials and the hypodermic needles to dry said junctures, to engage the hypodermic needles between a pair of rollers applying lubricant to said hypodermic needles, to a pair of jaws reciprocated toward and away from the needles and successively receiving sheaths from a hopper whereby the sheaths are engaged over the hypodermic needles but not firmly engaged on the vials. Subsequently the vials are presented by the turret to a plunger carrying lubricant and reciprocated into and out of the open ends of the vials to lubricate the interiors of the vials. After the vials are internally lubricated, the sheaths over the hypodermic needles are presented to a second pair of jaws reciprocated toward and away from intermediate portions of the sheaths in synchronism with a pneumatically actuated plunger reciprocated toward and away from the tops of the sheaths while the second pair of jaws compress the sheaths to force the sheaths completely on the vials. After the sheaths are completely engaged on the vials and over the hypodermic needles, the open ends of the vials are presented to a jet of air to internally dry said vials. Subsequently the turret positions successive vials having sheathed hypodermic needles to a discharge tube which delivers them to a suitable depository.

In the drawings:

FIG. 6 is a top plan view of the rack;

FIG. 7 is a front view of the rack;

FIG. 8 is a fragmentary elevational view of the table provided with the reciprocable members or mandrels and the guiding member receiving the vials from the rack;

FIG. 9 is a view similar to FIG. 8 showing alternate vials in the rack being positioned on adjacent mandrels;

FIG. 10 is a view showing the vials remaining in the rack being delivered to adjacent mandrels subsequently positioned by the table;

FIG. 11 is a top plan view of the apparatus;

FIG. 13 is a fragmentary elevational view of a plurality of devices for cleaning the vials as shown in steps B, C and D of FIG. 1;

FIG. 14 is a top plan view of said cleaning devices looking from the line 14—14 of FIG. 13 in the direction of the arrows;

FIG. 15 is a side elevational view of means for actuating said cleaning devices looking from the line 15—15 of FIG. 13 in the direction of the arrows;

FIG. 20 is a schematic view of a pneumatic circuit for shutting-off the supply of sheaths to the first pair of jaws when an empty turret recess is presented to said first pair of jaws.

The operating parts of the apparatus are supported by a cabinet 20.

Figure 3:
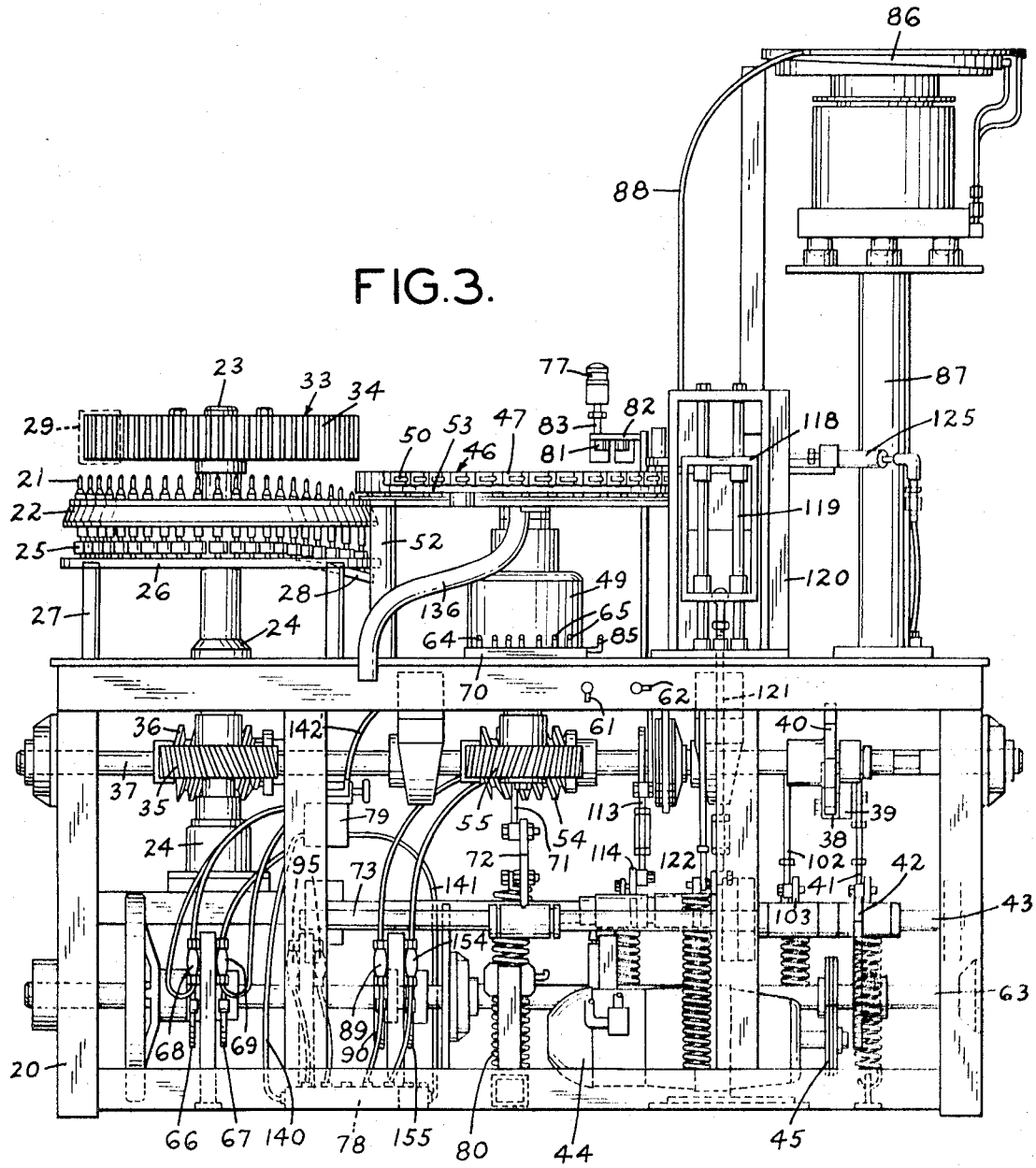
FIG. 3 is an elevational view of the apparatus.

Vials $v$ having hypodermic needles $n$ secured in throats $t$ of the vials are manually positioned on the upper portions of mandrels 21 slidably mounted in a table 22 secured on a shaft 23 rotatably supported by the cabinet 20, as at 24 in FIG. 3. The mandrels 21 are provided with weights 25 to maintain the lower ends of the mandrels in contact with an annular member 26 supported in elevated position and below the table 22 from the cabinet 20 by posts 27, as shown in FIGS. 3, 11 and 13. The annular member 26 maintains the upper portions of the mandrels above the table 22 for the major portion of the travel of said table and said mandrels are permitted to drop by gravity and position the upper ends of the mandrels 21 below the upper surface of the table 22 by a declining portion 28 in said annular member 26, as shown in FIGS. 3 and 13, for a purpose to be hereinafter described.

Figure 4:
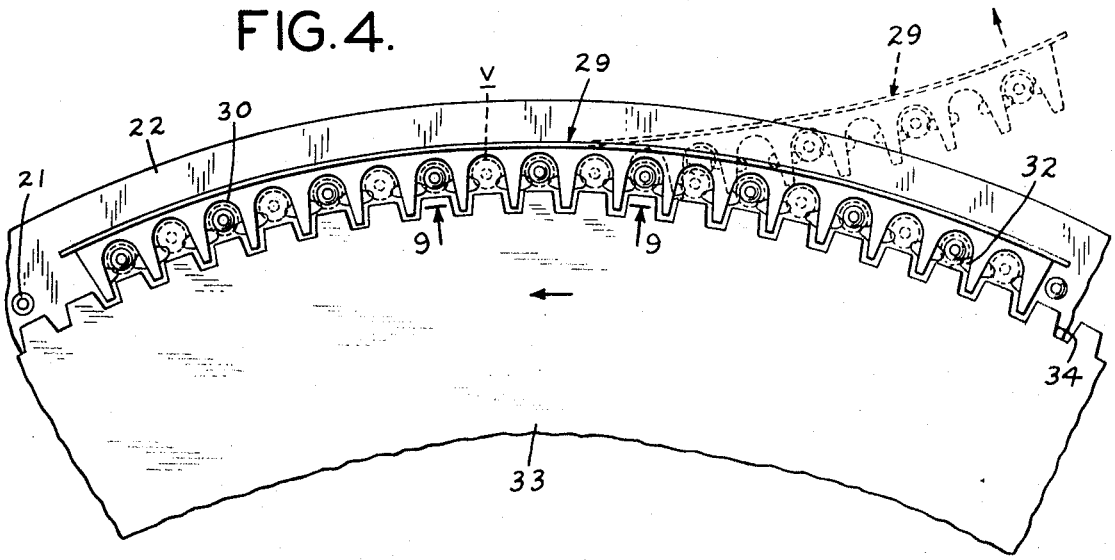
FIG. 4 is a top plan view of a member for guiding vials onto the intermittently rotated table and showing said member receiving alternate vials carried by the rack.
Figure 5:
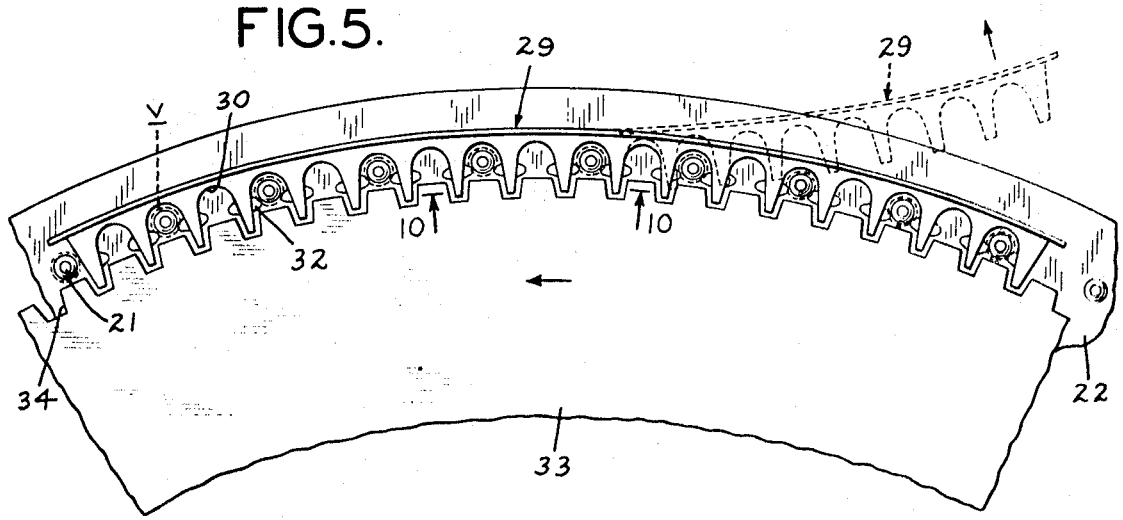
FIG. 5 is a view similar to FIG. 4 and showing the vials remaining in the rack being delivered to the guiding member.

The vials $v$ are manually deposited on the mandrels 21 by a rack 29 of flexible material and having recesses 30 spaced from each other a distance less than the space between the upper portions of the mandrels 21, so that alternate vials in the recesses 30 will be engaged on the upper portions of adjacent mandrels 21, as shown in FIGS. 4 to 10, inclusive. The vials $v$ are retained in the recesses 30 by a band 31 extending transversely of the lower portions of said recesses and lugs 32 extending laterally from the side walls of the recesses 30. After the rack 29 has been filled with vials v in its normal straight position, as shown in FIGS. 6 and 7, the rack is flexed and positioned on a round member 33 secured on the shaft 23 above the mandrels 21 and having equidistantly spaced recesses 34 in the periphery to be engaged by the walls of the recesses 30 of the rack 20, as shown in FIGS. 4 and 5. Alternate vials v in the recesses 30 are engaged on adjacent mandrels 21 by manually sliding the rack 29 down the member 33, as shown in FIG. 9. After the alternate vials v are deposited on adjacent mandrels 21, the rack 29 is lifted from the recesses 34 to be re-deposited in another succeeding group of recesses 34 aligned with empty mandrels when the depositing of the vials remaining in the alternate recesses 30 on the adjacent empty mandrels 21 is repeated.

The table 22 and the guide member 33 are intermittently rotated by the shaft 23 being provided with a worm gear 35 meshing with a worm 36 secured on a shaft 37 rotatably supported in the cabinet 20 and intermittently rotated by a pawl 38 supported by a bracket 39 in the cabinet 20 and said pawl engaging a ratchet-wheel 40 secured on the shaft 37. The pawl 38 is actuated by a crank-arm 41 connected to the pawl 38 and reciprocated by a cam disc 42 secured on a shaft 43 rotatably supported in the cabinet 20 and continuously rotated by an electric motor 44 through belts engaging pulleys on the drive shaft of the motor 44 and on the shaft 43 and an intermediate shatf 63, as shown at 45 in FIGS. 3 and 15.

Figure 2:
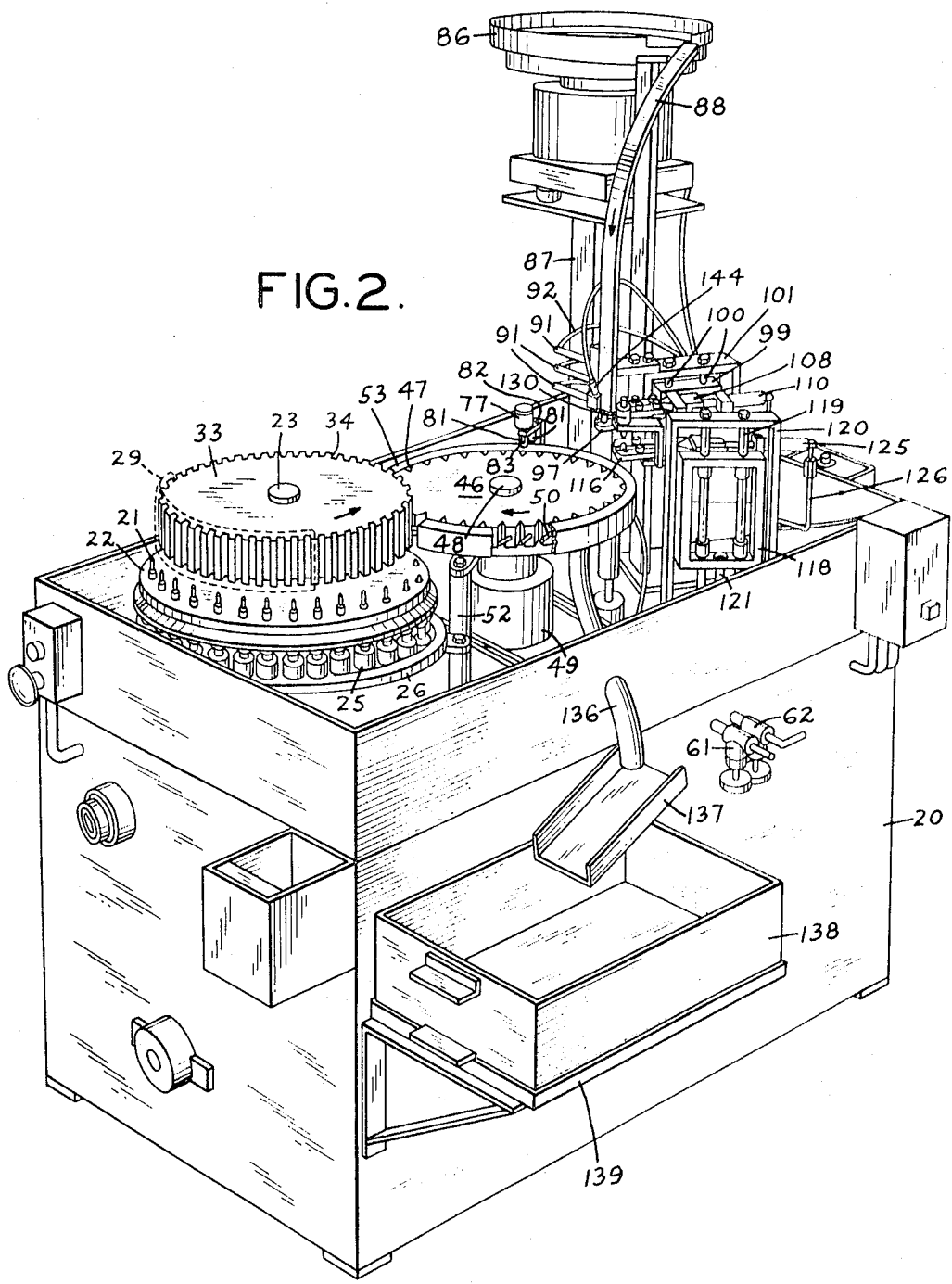
FIG. 2 is a perspective view of the apparatus for carrying out the steps shown in FIG. 1.
Figure 17:
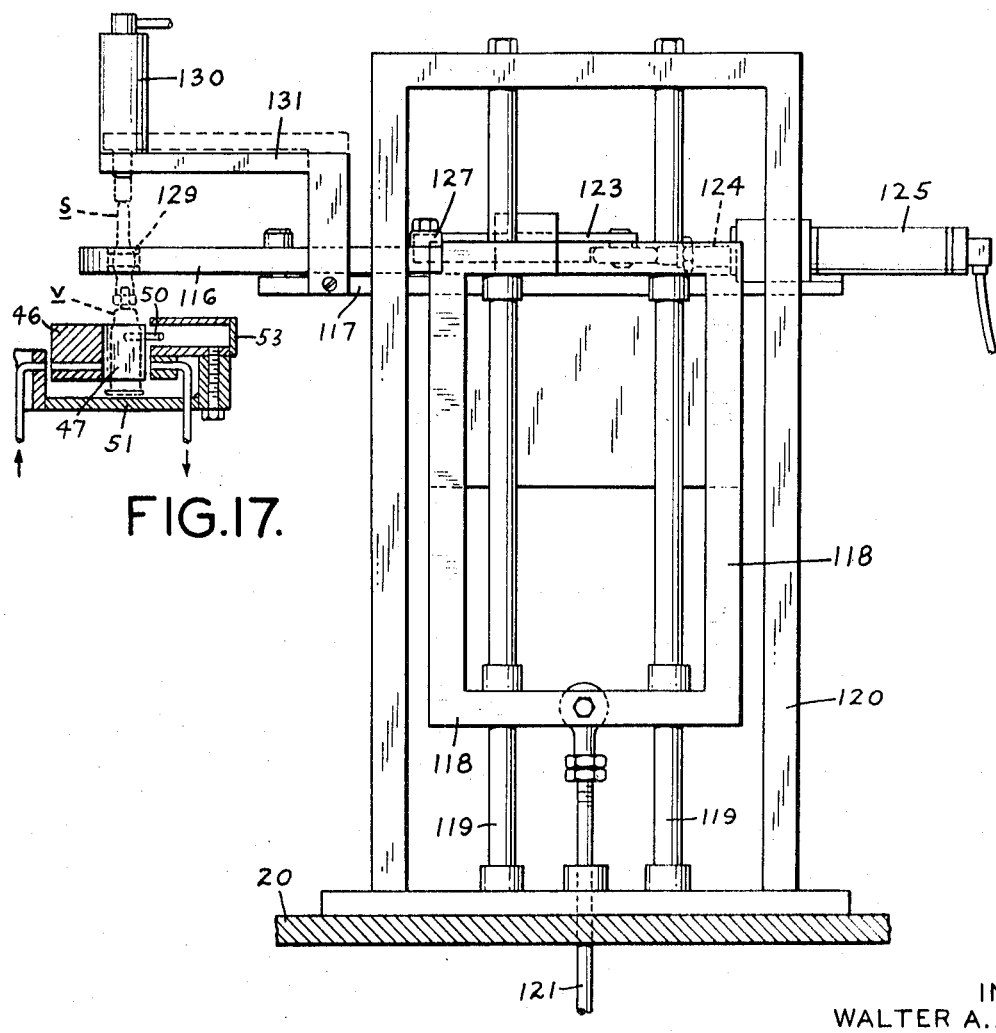
FIG. 17 is a side elevational view of the jaws and plunger of FIG. 16 and means for reciprocating said jaws and plunger and for opening and closing the jaws.

The intermittent rotation of the table 22 will successively present the vials v relative to a turret comprising a disc 46 having equidistantly spaced recesses 47 in the periphery and said disc 46 being secured on a shaft 48 rotatably mounted in the cabinet 20, as at 49 in FIGS. 2 and 3. The disc 46 is provided with equidistantly spaced pins 50 extending obliquely from the periphery of the disc 46 in advance of each recess 47 to engage and remove successive vials v from the table 22 while the mandrels 21 are resting on the declining portion 28 of the annular member 26, as shown in FIGS. 3 and 13. The vials v being removed from the table 21 to the recesses 47 by the pins 50, are supported by an annular member 51 supported from the cabinet by posts 52 to extend beyond the periphery of the disc 46. The vials on the annular member 51 are retained in the recesses 47 by an annular rail 53 of U-shape in cross-section and supported by the annular member 51, as shown in FIG. 17. The turret disc 46 is intermittently rotated in synchronism with and in the opposite direction of rotation of the table 22 from the shaft 37 by a worm 54 secured on the shaft 37 and meshing with a worm-gear 55 secured on the shaft 48, as shown in FIG. 3. The table 22 is rotated in a counter-clockwise direction and the turret disc 46 is rotated in a clockwise direction, as shown by the arrows in FIGS. 2, 11 and 12.

The turret disc 46 will successively present the vials to cleaning devices comprising five water nozzles 56, three brushes 57 and two air nozzles 58 carried by a frame 59 slidably mounted on rods 60 supported by the cabinet 20, as shown in FIGS. 13 and 15. Three of the water nozzles 56 precede and alternate with the brushes 57, and the remaining water nozzles 56 succeed the last brush 57 with the air nozzles 58 succeeding the last water nozzle 56 in the direction of travel of the turret disc 46. The water and air are supplied to the nozzles 56 and 58, respectively, from suitable sources, not shown, connected to valves 61 and 62, respectively, controlling the flow of the water and the air. The supply of water and air is metered to the nozzles 56 and 58 in synchronism with the actuation of the turret disc 46 so that jets of water and air are delivered to the vials v during the periods of rest of the rotation of the turret disc 46. This is accomplished by cam discs 66 and 67 secured on the intermediate shaft 63 and actuating valves 68 and 69, respectively, having the inlets connected to the outlets of the valves 61 and 62, respectively. The outlet of the valve 68 is connected to a chamber in a jacket 70 provided with nipples 64 connected to the water nozzles 56. The outlet of the valve 69 is connected to a combination pressure regulator, lubricator and filter 79 having the lubricated air outlet connected by a tube 140 to a compartment in a jacket 78 and the filtered air outlet connected by a tube 141 to another compartment in the jacket 78, as shown in FIG. 3. Also the filtered air outlet of the combination pressure regulator, lubricator and filter 73 is connected by a tube 142 to a compartment in the jacket 70 provided with nipples 65 connected to the air nozzles 58, as shown in FIG. 11. The annular member 51 is provided with openings corresponding to the path of travel of the nozzles 56 and 58 and the brushes 57 to permit the nozzles 56 and 58 and the brushes 57 to enter the open bottoms of the vials v. The nozzles 56 and 58 and the brushes 57 are reciprocated into and out of the vials in synchronism with the intermittent rotation of the turret disc 46 by a rod 71 connected at its upper end to the frame 59 and the lower end connected to an intermediate portion of a crank arm 72 pivoted on a shaft 73 supported in the cabinet 20. The arm 72 is provided with a roller 74 engaging a cam disc 75 secured on the shaft 43, as shown in FIG. 15. The roller 74 is yieldingly urged into engagement with the cam disc 75 by a spring 80.

After the vials v have been cleaned, the turret disc 46 will successively present the hypodermic needles n to a pair of rollers 81 rotatably supported by a bracket 82 supported from the cabinet, as shown in FIGS. 2, 3 and 11. The rollers 81 are positioned on the inner and outer circumferences of the path of travel of the needles n to engage diametrically opposite sides of the needles, as shown at station or step E of FIG. 1, and in FIGS. 2, 3 and 11. Lubricant, such as silicone, is supplied to the rollers 81 by a nozzle 83 of a reservoir 77 supported by the bracket 82. The hypodermic needles n are lubricated to facilitate engagement of a sheath s of suitable flexible material, such as rubber, over said needles n.

After the needles n have been lubricated, they are successively presented to a nozzle 84 supported by the rail 53 to eject a jet of air onto the junctures between the needles n and the vial throats t to dry said junctures. The air is supplied to the nozzles 84 during the periods of rest in the intermittent rotation of the turret disc 46 by connecting said nozzle to a nipple 85 supported by the block or jacket 70 and connected to a valve 89 actuated by a disc cam 90, as shown in FIG. 3. The valve 89 receives filtered air from the jacket 78. The air nozzle 84 may be positioned in advance of the lubricating rollers 81 if it is found that the jet of air will scatter the lubricant on the needles n.

After the junctures between the hypodermic needles n and the throats t have been dried, the turret disc 46 successively presents the vials v to means to position the sheaths s over the hypodermic needles n comprising a hopper 86 for said sheaths supported in elevated position by a standard 87 from the cabinet 20 and said hopper having a delivery chute 88. The discharge end of the delivery chute 88 is provided with a gate in the form of pistons 143 slidable in air cylinders 91 transversely of the chute and yieldingly urged to open said chute. Said pistons are intermittently actuated to close the chute by air pressure delivered to said cylinders 91 connected by hoses 92 to nipples 93 supported in a block 94 on the cabinet 20, and said nipples 93 connected to valves 95 actuated in synchronism with the turret 46 by cam discs 96 on the shaft 63, FIGS. 3 and 20. The valves 95 receive lubricated air from the lubricated air compartment of the jacket 78. The chute 88 will supply successsive sheaths s to a pair of jaw levers 97 by the action of the springs on the piston gates. To assure the periodic discharge of the sheaths s from the chute 88, there is provided a kicker in the form of a piston in a cylinder 144 periodically actuated by the valves 95 connected to a nipple 145 in the block 94 and said nipple 145 being connected to the cylinder 144 through a hose 146, as shown in FIGS. 11 and 12.

In the absence of a vial *v* in a recess 47 in the turret disc 46 being presented to the discharge end of the chute 88, the gate pistons 143 are closed by a jet of air passing through a passage 147 in the turret disc 46 at each recess 47 and said passages being succesively positioned by the intermittent rotation of the turret disc 46 in register with an outlet of a pipe 148 supported by the annular member 51 and connected to a source of air pressure controlled by a pressure regulator 149, FIG. 20. When there is no vial *v* in the recess 47 positioned at the chute 88, the air from the passage 147 will flow across said recess 47 to the inlet of a pipe 150 supported by the annular member 51 and connected to a diaphragm valve 151 normally closing an air line 152 connected to a coupling 153 interposed in the tube 92, so that air from the pressure regulator 149 flowing through the pipe 148, passage 147, recess 47, pipe 150 will open the valve 151 permitting air to pass through the pipe 152, the coupling 153 and the tube 92 to the cylinders 91 to actuate the pistons 143 to close the chute 88.

Figure 18:
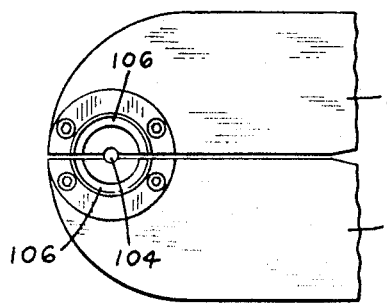
FIG. 18 is a fragmentary top plan view of the jaws for performing step G of FIG. 1.
Figure 19:
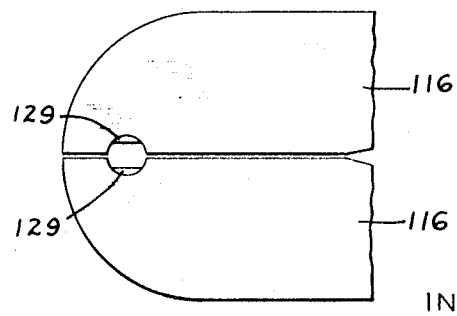
FIG. 19 is a fragmentary top plan view of the jaws for performing step I of FIG. 1.
Figure 12:
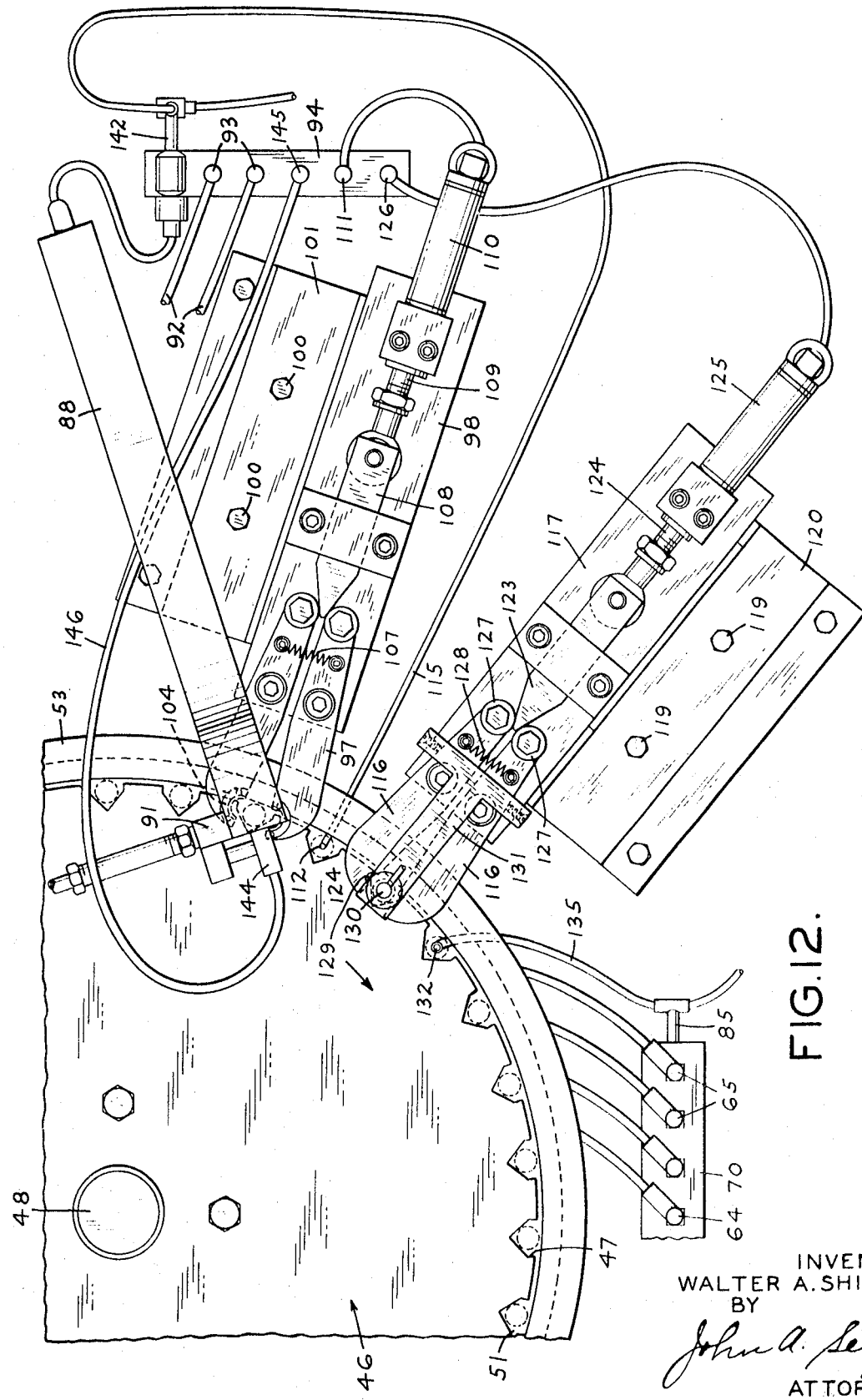
FIG. 12 is a fragmentary top plan view of two pairs of jaws for carrying out steps G and I of FIG. 1, of a lubricant carrying plunger of step H of FIG. 1 and of an air nozzle for performing step J of FIG. 1.
Figure 16:
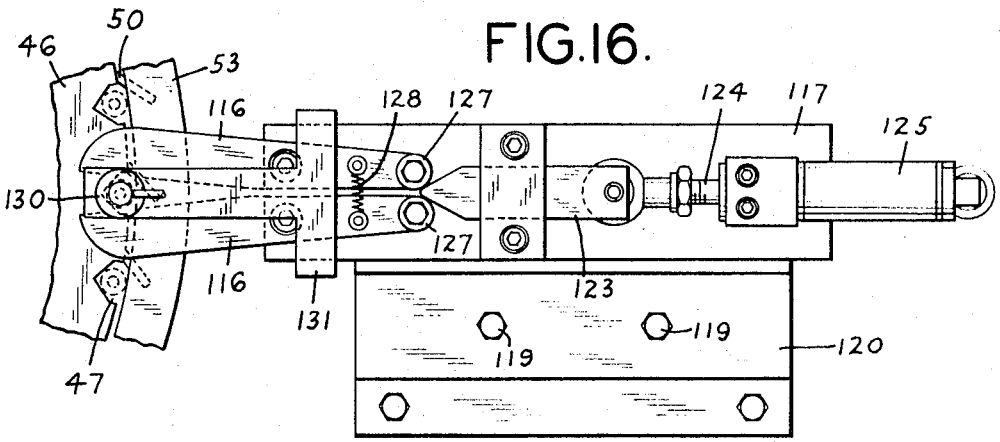
FIG. 16 is a top plan view of the jaws and the pneumatically actuated plunger for performing step I of FIGURE 1.

The jaw levers 97 are pivotally mounted on a platform 98 carried by a frame 99 slidably mounted on posts 100 in a bracket 101 on the cabinet 20, FIGS. 2, 11 and 12. The frame 99 is reciprocated from the shaft 43 by a rod 102 connected to the frame 99 and to an arm 103 pivoted on the shaft 73 and actuated by a cam disc on the shaft 43, as shown in FIG. 3. Each jaw lever 97 is provided with a jaw having a semi-circular recess 104 and an outwardly tapering recess 105, as shown at station G in FIG. 1. A semi-circular tubular member 106 is mounted on the upper surface of each jaw lever 97, as shown at station G in FIG. 1 and in FIG. 18. The jaws 104–106 are yieldingly urged from each other by a spring 107 and are forcedly moved to mating or close position by a wedge member 108 slidably mounted on the platform 98 and pivotally connected to a piston rod 109 of a pneumatic cylinder 110 mounted on the platform 98 and connected to a nipple 111 supported by the block 94 and connected to a valve 154 receiving filtered air from the jacket 78 and actuated by a cam disc 155 on the shaft 63, as shown in FIG. 3.

Figure 1:
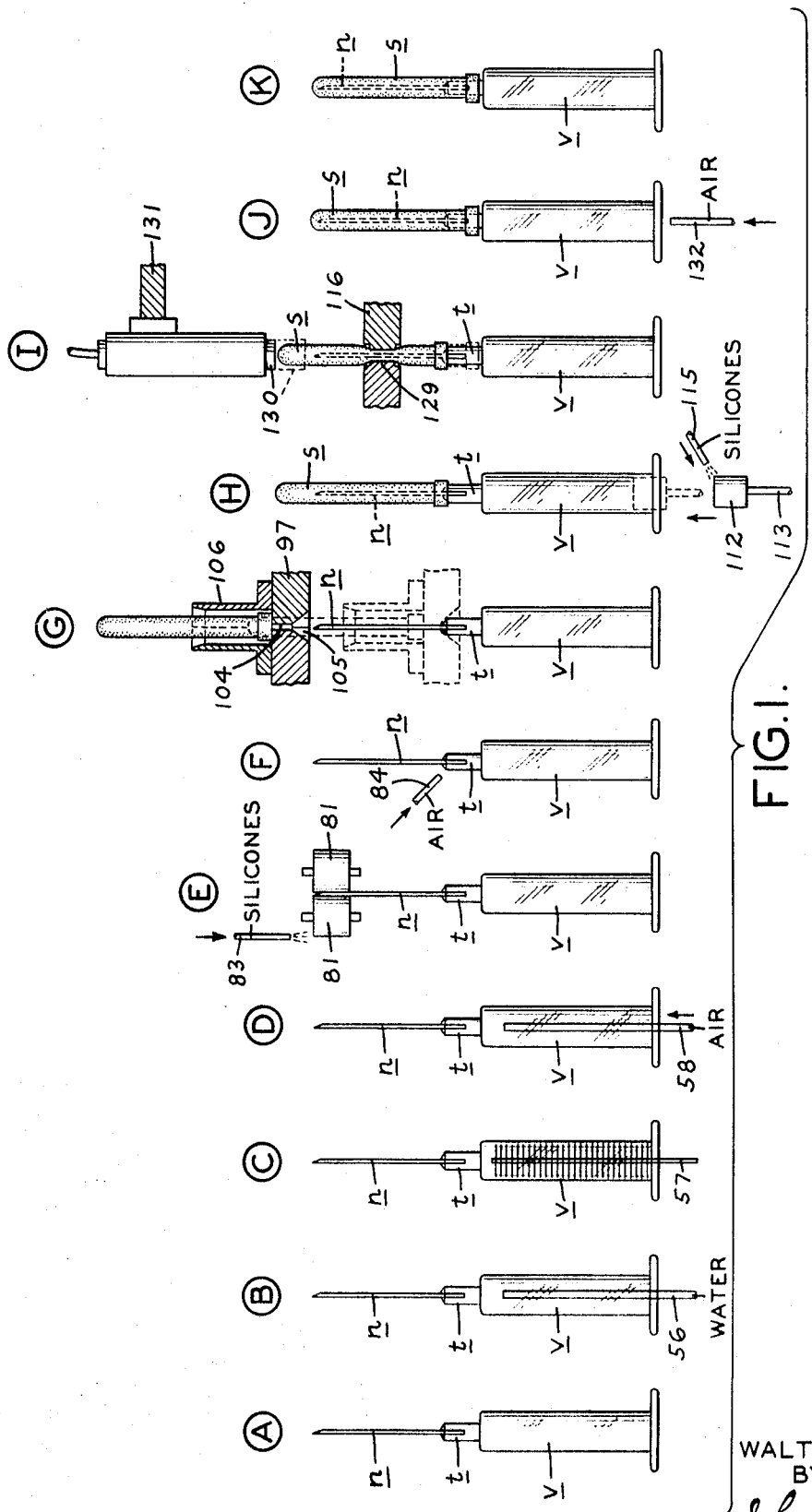
FIG. 1 is a view illustrating the successive steps used in preparing the vials and hypodermic needles and applying sheaths to the hypodermic needles.

The actuation of the pistons 143 by the cam disc 96 closing the valves 95 will successively position the sheaths *s* in the tubular member 106 when the jaw levers 97 are actuated to close position by the wedge member 108 and the platform 98 is in elevated position above the needle *n*, as shown in full lines at station G in FIG. 1. Subsequently the platform 98 is lowered to the broken line position at station G in FIG. 1 which will partially engage the sheath *s* over the needle *n*. Thereupon the wedge member 108 is withdrawn from the jaw levers closing position to permit the spring 107 to open the jaws 104–106 at which time the sheath *s* will drop by gravity onto the end of the vial throat *t* and fully cover the needle *n*, as shown at station H in FIG. 1.

The subsequent movement of the turret disc 46 will position the open bottom of the vial *v* in register with an opening in the member 51 in alignment with a plunger 112 slidably mounted below the member 51 and actuated into and out of the vial on the member 51 in register with said opening during the periods of rest of the turret disc 46. This is accomplished by a rod 113 connected to the plunger 112 and pivotally connected to an arm 114 pivoted on the shaft 73 and riding on a cam disc on the shaft 43, as shown in FIG. 3. When the plunger 112 is in position below the member 51, it is lubricated by a jet of lubricant, such as silicone, from a nozzle 115 connected to a supply tank 156 through a nipple 157 supported by the block 94. The plunger 112 will internally lubricate the vial *v*.

The next intermittent movement of the turret disc 46 will position the sheath *s* between jaws 129 of jaw levers 116 pivotally mounted on a platform 117 supported by a frame 118 slidable on rods 119 supported in a frame 120 mounted on the cabinet 20, as shown in FIGS. 2, 3, 11, 12, 16 and 17. The frame 118 is reciprocated in synchronism with the intermittent movement of the turret disc 46 by a rod 121 pivotally connected to the frame 118 and to an arm 122 pivoted on the shaft 73 and provided with a roller yieldingly urged into engagement with a cam disc on the shaft 43. The jaw levers 116 are actuated in the same manner as the jaw levers 97 by a wedge member 123 slidable on the platform 117 and pivotally connected to a piston 124 of an air cylinder 125 supported by the platform 117 and connected to a nipple 126 supported by the block 94 and connected to the valve 154 actuated by the cam disc 155 on the shaft 63, as shown in FIG. 3. The wedge member 123 is reciprocated by the air in the cylinder 125 relative to rollers 127 on the jaw levers 116, said rollers being urged by a spring 128 into engagement with the wedge member 123. The spring 128 normally positions the jaws 129 of the jaw levers 116 from each other or to open position. During the rotation of the turret disc 46, the frame 118 is in its upper position with the jaws 129 separated from each other by the spring 128. During the periods of rest in the intermittent rotation of the turret disc 46, the frame 118 will lower the jaws 129 relative to an intermediate portion of the sheath *s* with the jaws 129 spaced from each other and out of engagement with the diametrically opposite portions of the sheath.

In conjunction with the operation of the jaws 129, there is provided an air actuated plunger 130 positioned above the jaws 129 and in vertical alignment above the sheath *s* positioned between the jaws 129. This is accomplished by mounting the plunger 130 on a bracket 131 carried by the platform 117, so that the downward movement of the frame 118 will simultaneously position the open jaws 129 on the opposite sides of the sheath and engage the plunger 130 with the closed end of the sheath *s*, as shown at station I in FIG. 1 and in FIG. 17.

Subsequent to the positioning of the open jaws 129 relative to the intermediate portion of the sheath *s* and the engaging of the plunger 130 against the closed end of said sheath, the piston 124 is actuated to close the jaws 129 and compress said intermediate portion of the sheath 129 to expel air from the sheath and subsequently to the closing of the jaws 129, the platform 117 will be actuated to its lowermost position to fully engage the sheath on the vial throat *t*. Subsequent to the lowermost position of the platform 117, air is supplied to the plunger 130 to apply pressure to the closed end of the sheath *s* and embed the needle *n* into the closed end of the sheath.

The next intermittent movement of the turret disc 46 will position the vial *v* having a completely assembled sheath relative to an air nozzle 132 fixedly mounted below the annular member 51 in alignment with an opening in said member 51 to eject a steam of filtered air into the interior of the vial to dry the same. Air is supplied to the nozzle 132 through a hose 135 connected to the nipple 85 and intermittent burst of air is supplied by the valve 89.

After the interior of the vial *v* is dried, it is presented by the turret disc 46 to a discharge tube 136 having its inlet communicating with an opening in the annular member 51 and its discharge end positioned relative to a chute 137 supported by the cabinet 20 and discharging the sheathed vials into a tray 138 removably supported by a shelf 139 mounted on the cabinet 20.

Having thus described my invention, I claim:

1. The method of applying a sheath over a hypodermic needle secured in a vial which comprises cleaning the interior of the vial, lubricating the hypodermic needle, drying the juncture between the hypodermic needle and the vial, positioning a sheath over the hypodermic needle, lubricating the interior of the vial, collapsing an intermediate portion of the sheath positioned over the hypodermic needle, and forcing the sheath fully on the vial, and drying the interior of the vial.

2. The method of applying a sheath over a hypodermic needle secured in a vial as claimed in claim 1, wherein the step of cleaning the vial consist of wetting the interior of the vial, brushing the wet interior, wetting the interior a second time, and drying the interior of the vial.

3. The method of applying a sheath over a hypodermic needle secured in a vial as claimed in claim 1, the hypodermic needle is lubricated by rolling the lubricant on the hypodermic needle.

4. The method of applying a sheath over a hypodermic needle secured in a vial as claimed in claim 1, the juncture between the hypodermic needle and the vial is dried by a stream of air.

5. The method of applying a sheath over a hypodermic needle secured in a vial as claimed in claim 1, the interior of the vial is lubricated by sliding the lubricant onto the interior of the vial.

6. The method of applying a sheath over a hypodermic needle secured in a vial as claimed in claim 1, embedding the needle in the closed end of the sheath during the forcing of the sheath fully on the vial.

7. In apparatus for applying a sheath over a hypodermic needle secured in a vial, equidistantly spaced members intermittently actuated in an arcuate path and each member arranged to receive a vial having a hypodermic needle secured therein, a turret rotated synchronously with the actuation of the members and having a series of equidistantly spaced recesses to receive said vials from the members, cleaning devices simultaneously reciprocated in a plane parallel to the axis of rotation of the turret and into and out of the open end of the vials in the recesses of the turret to clean the interior of the vials during the periods of rest in the rotation of the turret, means mounted relative to the path of travel of the needles secured in the vials in the recesses of the turret and arranged to lubricate said needles in sequence to the cleaning of the vials, means mounted relative to the travel of the vials on the turret and subsequent to the cleaning of the vials and arranged to discharge a stream of drying fluid on the junctures between the vials and the hypodermic needles during the periods of rest of the turret, a chute mounted relative to the turret subsequent to the drying fluid means to successively deliver sheaths above the path of travel of the hypodermic needles secured in the vials on the turret, a first pair of jaws yieldingly urged to open position and reciprocated between the chute and the needles, means to close the first pair of jaws around the foremost sheath in the chute in the uppermost reciprocated position of the jaws and said jaw closing means maintaining the jaws in closed position during the movement of the jaws from the chute to the needles to position said sheath over the needle, said jaw closing means being actuated to permit opening of the jaws subsequent to the positioning of the sheath over the needle and during the movement of the jaws toward the chute, means reciprocally mounted below the turret and carrying lubricant and actuated into and out of the open end of the vials on the turret subsequent to the positioning of the sheath over the needle and during the periods of rest of the turret to lubricate the interior of said vial, a second pair of jaws yieldingly urged to open position and reciprocated from above the sheath on the needle to an intermediate portion of said sheath subsequent to the lubricating means, a plunger mounted in spaced relation above the second pair of jaws and reciprocated simultaneously with the reciprocation of the second pair of jaws, means to close the second pair of jaws when they are on opposite sides of an intermediate portion of the sheath with the plunger engaging the closed end of the sheath, the continued movement of said second pair of jaws and the plunger toward the vial forcing the sheath onto the vial, subsequent to the forcing of the sheath onto the vial the means to close the second pair of jaws is actuated to permit the opening of the second pair of jaws during the reciprocal movement of the second pair of jaws and the plunger from the sheath, means fixedly mounted below the turret and arranged to discharge a drying fluid into the vial subsequent to the forcing of the sheath onto the vial and during the periods of rest of the turret, and a discharge tube mounted below the turret and subsequent to the drying of the interior of the vial to remove vials having sheathed hypodermic needles from the apparatus.

8. In apparatus for applying a sheath over a hypodermic needle secured in a vial as claimed in claim 7, a table rotatably mounted and intermittently rotated and supporting the equidistantly spaced members, and an annular member spaced below the table and supporting the equidistantly spaced members to extend above the table and support the vials and provided with a declining portion to permit the equidistantly spaced members to move out of vial supporting position and permit removal of the vials to the turret recesses.

9. In apparatus for applying a sheath to a hypodermic needle secured in a vial as claimed in claim 7, an annular series of recesses rotated in synchronium with the equidistantly spaced members and equidistantly spaced from each other and out of alignment with and above the equidistantly spaced members, and a rack of flexible material provided with equidistantly spaced recesses to support the vials, and said rack adapted to be flexed around the series of recesses to position the vials between said series of recesses whereby downward movement of the rack will position alternate vials on adjacent equidistantly spaced members.

10. Apparatus as claimed in claim 7, wherein the turret is provided with pins projecting laterally from the periphery thereof in advance of each recess in said turret to remove successive vials from the equidistantly spaced members to said recesses in the turret.

11. Apparatus as claimed in claim 7, a rail encircling the recesses in the turret during the travel of said recesses from and to the equidistantly spaced members.

12. Apparatus as claimed in claim 7, wherein the cleaning devices comprise water nozzles, brushes alternating with said water nozzles, a second group of water nozzles succeeding the brushes, and adjacent air nozzles succeeding the second group of water nozzles.

13. In apparatus as claimed in claim 12, means to supply water and air to the water and air nozzles during the periods of rest of the turret comprising a water valve connected to the water nozzles and an air valve connected to the air nozzles, and continuously rotated cam discs actuating said valves.

14. Apparatus as claimed in claim 7, wherein the means to lubricate the hypodermic needles comprises a pair of rollers mounted on the inner and outer circumferences of the path of travel of the needles, and a nozzle mounted adjacent to the rollers and connected to a supply of lubricant to coat the rollers with said lubricant.

15. Apparatus as claimed in claim 7, wherein the means to discharge a stream of drying fluid on the junctures between the vials and the hypodermic needles comprises a nozzle mounted adjacent to the outer circumference of the path of travel of the recesses in the turret, a second air valve connected to said nozzle and a third continuously rotated cam disc actuating said fourth air valve.

16. In apparatus as claimed in claim 7, means to control the discharge of successive sheaths from the chute comprising air cylinders mounted on the chute, and pistons slidable transversely of the chute and yieldingly urged to open the chute for the discharge of sheaths and actuated by air in the cylinders to close the chute during the intermittent movement of the turret.

17. In apparatus as claimed in claim 16, a third air valve connected to the cylinders mounted on the chute, and a fourth continuously rotated cam disc actuating said third air valve.

18. Apparatus as claimed in claim 17, wherein each recess in the turret is provided with an air passage, an air discharge nozzle located on the inner circumference of the path of travel of said air passage, an air inlet nozzle on the outer circumference of the path of travel of the air passage in alignment with the air discharge nozzle and in alignment with the discharge end of the chute, a regulated supply of air pressure connected to the air discharge nozzle, a separate supply of air pressure connected to the air cylinders on the chute, a valve interposed in said separate supply of air pressure and normally closing said supply of air pressure from the air cylinders on the chute and connected to the air inlet nozzle and actuated by the regulated supply of air pressure to actuate the pistons and close the chute.

19. Apparatus as claimed in claim 7, wherein the means to close the first and second pairs of jaws comprises wedge members reciprocated toward and away from said pairs of jaws, a pneumatically operated piston connected to each wedge member, a fourth air valve connected to the pneumatically operated pistons, and a fifth continuously rotated cam disc actuating said fourth air valve.

20. Apparatus as claimed in claim 7, wherein the plunger associated with the second pair of jaws is pneumatically actuated subsequently to the engagement of the plunger with the closed end of the sheath to embed the needle in the closed end of the sheath.

References Cited

UNITED STATES PATENTS

| | | | |
|---|---|---|---|
| 2,731,012 | 1/1956 | Henderson | 128—215 |
| 2,879,766 | 3/1959 | Wilburn | 128—218 S |
| 2,940,445 | 6/1960 | Adams | 128—218 N |
| 3,200,486 | 8/1965 | Shields | 29—422 |
| 3,247,850 | 4/1966 | Gettig | 128—221 |
| 3,366,113 | 1/1968 | Hobbs | 128—218 D |

JOHN F. CAMPBELL, Primary Examiner

D. P. ROONEY, Assistant Examiner

U.S. Cl. X.R.

128—218 D, 215, 221; 53—319, 349